US011981527B2

(12) United States Patent
Jo et al.

(10) Patent No.: US 11,981,527 B2
(45) Date of Patent: May 14, 2024

(54) SHEET CONVEYING DEVICE AND IMAGE FORMING APPARATUS

(71) Applicant: BROTHER KOGYO KABUSHIKI KAISHA, Nagoya (JP)

(72) Inventors: Hidenori Jo, Nagoya (JP); Mariko Mogi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/681,227

(22) Filed: Feb. 25, 2022

(65) Prior Publication Data

US 2022/0274799 A1 Sep. 1, 2022

(30) Foreign Application Priority Data

Feb. 26, 2021 (JP) ................................ 2021-030201

(51) Int. Cl.

| | |
|---|---|
| ***B65H 31/02*** | (2006.01) |
| ***B41J 29/13*** | (2006.01) |
| ***B65H 29/22*** | (2006.01) |
| ***G03G 21/16*** | (2006.01) |

(52) U.S. Cl.

CPC .............. *B65H 31/02* (2013.01); *B41J 29/13* (2013.01); *B65H 29/22* (2013.01); *G03G 21/1633* (2013.01); *B65H 2402/31* (2013.01); *B65H 2402/54* (2013.01); *B65H 2404/725* (2013.01)

(58) Field of Classification Search

CPC .... B31H 31/02; B31H 29/22; B31H 2402/31; B31H 2402/54; B31H 2404/725; B41J 29/13; G03G 21/1633

See application file for complete search history.

(56) References Cited

U.S. PATENT DOCUMENTS

| | | | | |
|---|---|---|---|---|
| 7,395,026 B2 * | 7/2008 | Seo | G03G 15/6552 | 271/278 |
| 7,463,860 B2 * | 12/2008 | Nobe | G03G 15/6552 | 399/25 |
| 8,424,871 B2 * | 4/2013 | Ino | G03G 15/602 | 271/223 |
| 8,430,399 B1 * | 4/2013 | Huang | B65H 1/04 | 271/223 |
| 10,040,661 B2 * | 8/2018 | Yoshida | B65H 31/36 | |
| 2021/0094781 A1 * | 4/2021 | Yoshida | B65H 31/20 | |

FOREIGN PATENT DOCUMENTS

| | | |
|---|---|---|
| JP | 2018165204 A * | 10/2018 |
| JP | 2018 172186 A | 11/2018 |
| JP | 2020 169078 A | 10/2020 |

* cited by examiner

*Primary Examiner* — Leslie A Nicholson, III
(74) *Attorney, Agent, or Firm* — Merchant & Gould P.C.

(57) ABSTRACT

A sheet conveying device includes a sheet-discharging roller, a sheet-discharge tray, a sheet-discharge stopper, and a stopper urging portion including a contact member and an urging member. The sheet-discharge stopper has a first surface and a second surface located on a back side of the first surface and is pivotable between a non-use state in which the second surface faces upward and a use state in which the first surface faces upward. The sheet-discharge stopper is pivotable, in the use state, between a first use position and a second use position at which a distal end is lowered from the first use position. The sheet-discharge stopper is in contact with the contact member in the use state, and an area, of the sheet-discharge stopper is located below the second surface in the non-use state.

9 Claims, 8 Drawing Sheets

SHEET CONVEYING DEVICE AND IMAGE FORMING APPARATUS

CROSS REFERENCE TO RELATED APPLICATION

The present application claims priority from Japanese Patent Application No. 2021-030201, which was filed on Feb. 26, 2021, the disclosure of which is herein incorporated by reference in its entirety.

BACKGROUND

The following disclosure relates to a sheet conveying device and an image forming apparatus.

A conventional sheet conveying device includes a sheet-discharging roller configured to discharge a sheet in a sheet discharging direction, a sheet-discharge tray supporting the sheet discharged by the sheet-discharging roller, and a sheet-discharge stopper located downstream of the sheet-discharging roller in the sheet discharging direction.

The sheet-discharge stopper has a first surface and a second surface located on a back surface of the first surface, and the sheet-discharge stopper is pivotable between a non-use state in which the second surface faces upward and a use state in which the first surface faces upward. The sheet-discharge stopper in the use state is pivotable between a first use position and a second use position at which a distal end is lowered from the first use position. Then, the sheet-discharge stopper in the use state is in contact with a downstream end, in the sheet discharging direction, of the sheet discharged on the sheet-discharge tray.

The sheet conveying device further includes a stopper urging portion configured to urge the sheet-discharge stopper. The stopper urging portion includes a contact member being in contact with the sheet-discharge stopper in the use state and an urging member configured to urge the contact member. The urging member urges the contact member in a direction in which the sheet-discharge stopper moves from the second use position to the first used position. The sheet-discharge stopper has a contacted-portion being in contact with the contact member.

SUMMARY

In the conventional sheet conveying device, the distal end of the sheet-discharge stopper in the use state is lowered when weight of the sheets supported by the sheet-discharge stopper is increased, and the sheet-discharge stopper pivots in a direction directed from the first use position toward the second use position. That is, the sheet-discharge stopper in the use state repeats pivoting in which the distal end moves upward and downward in accordance with variation in the weight of the sheets supported by the sheet-discharge stopper. The contact member is continually in contact, by an urging force, with the contacted-portion of the sheet-discharge stopper which pivots repeatedly. Accordingly, there is a possibility that scratches occur on the contacted-portion. Since the contacted-portion is located on the second surface in the sheet conveying device and the second surface faces upward in the non-use state, the second surface is exposed outside the sheet conveying device. Accordingly, there is a problem that the contacted-portion with scratches is conspicuous to a user.

An aspect of the disclosure relates to a sheet conveying device and an image forming apparatus in which scratches are not conspicuous to the user in the non-use state of the sheet-discharge stopper.

In one aspect of the disclosure, a sheet conveying device includes a sheet-discharging roller configured to discharge a sheet in a sheet discharging direction, a sheet-discharge tray supporting the sheet discharged by the sheet-discharging roller, a sheet-discharge stopper configured to be brought into contact with a downstream end, in the sheet-discharging direction, of the sheet discharged on the sheet-discharge tray, the sheet-discharge stopper having a first surface and a second surface located on a back side of the first surface and being pivotable between a non-use state in which the second surface faces upward and a use state in which the first surface faces upward, the sheet-discharge stopper being located downstream of the sheet-discharging roller in the sheet discharging direction and pivotable, in the use state, between a first use position and a second use position at which a distal end of the sheet-discharge stopper is lowered from the distal end at the first use position, and a stopper urging portion including a contact member being in contact with the sheet-discharge stopper in the use state and an urging member configured to urge the contact member in a direction in which the sheet-discharge stopper moves from the second use position to the first use position. The sheet-discharge stopper is in contact with the contact member in the use state, and an area, of the sheet-discharge stopper, which is in contact with the contact member in the use state is located below the second surface in the non-use state.

In another aspect of the disclosure, an image forming apparatus includes a sheet conveying device. The sheet conveying device includes a sheet-discharging roller configured to discharge a sheet in a sheet discharging direction, a sheet-discharge tray supporting the sheet discharged by the sheet-discharging roller, a sheet-discharge stopper configured to be brought into contact with a downstream end, in the sheet-discharging direction, of the sheet discharged on the sheet-discharge tray, the sheet-discharge stopper having a first surface and a second surface located on a back side of the first surface and being pivotable between a non-use state in which the second surface faces upward and a use state in which the first surface faces upward, the sheet-discharge stopper being located downstream of the sheet-discharging roller in the sheet discharging direction and pivotable, in the use state, between a first use position and a second use position at which a distal end of the sheet-discharge stopper is lowered from the distal end at the first use position, and a stopper urging portion including a contact member being in contact with the sheet-discharge stopper in the use state and an urging member configured to urge the contact member in a direction in which the sheet-discharge stopper moves from the second use position to the first use position. The sheet-discharge stopper is in contact with the contact member in the use state, and an area, of the sheet-discharge stopper, which is in contact with the contact member in the use state is located below the second surface in the non-use state. The image forming apparatus further comprises an opening accessible to an inside of the image forming apparatus, and an opening/closing cover pivotable so as to open and close the opening. The opening/closing cover includes the sheet-discharge stopper and the stopper urging portion.

In another aspect of the disclosure, a sheet conveying device includes a sheet-discharging roller configured to discharge a sheet in a sheet discharging direction, a sheet-discharge tray supporting the sheet discharged by the sheet-discharging roller, a sheet-discharge stopper configured to be brought into contact with a downstream end, in the sheet-discharging direction, of the sheet discharged on the sheet-discharge tray, the sheet-discharge stopper having a first surface and a second surface located on a back side of the first surface and being pivotable between a non-use state in which the second surface faces upward and a use state in which the first surface faces upward, the sheet-discharge stopper being located downstream of the sheet-discharging roller in the sheet discharging direction and pivotable, in the use state, between a first use position and a second use position at which a distal end of the sheet-discharge stopper is lowered from the distal end at the first use position, and a spring; and a spring cover including a main body and a protrusion, the main body being configured to cover the spring, the protrusion protruding from the main body toward the sheet-discharge stopper and being in contact with the sheet-discharge stopper in the use state, the spring being configured to urge the spring cover in a direction in which the sheet-discharge stopper moves from the second use position to the first use position. The sheet-discharge stopper is in contact with the protrusion in the use state, and an area, of the sheet-discharge stopper, which is in contact with the protrusion in the use state is located below the second surface in the non-use state.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

EMBODIMENTS

Hereinafter, an embodiment obtained by embodying the present disclosure will be explained with reference to the drawings.

An image forming apparatus 10 according to the embodiment is a multifunction peripheral as an example of a specific embodiment of an image forming apparatus according to the present disclosure. A sheet conveying device 5 included in the image forming apparatus 10 is an example of a specific embodiment of a sheet conveying device according to the present disclosure.

Figure 1:
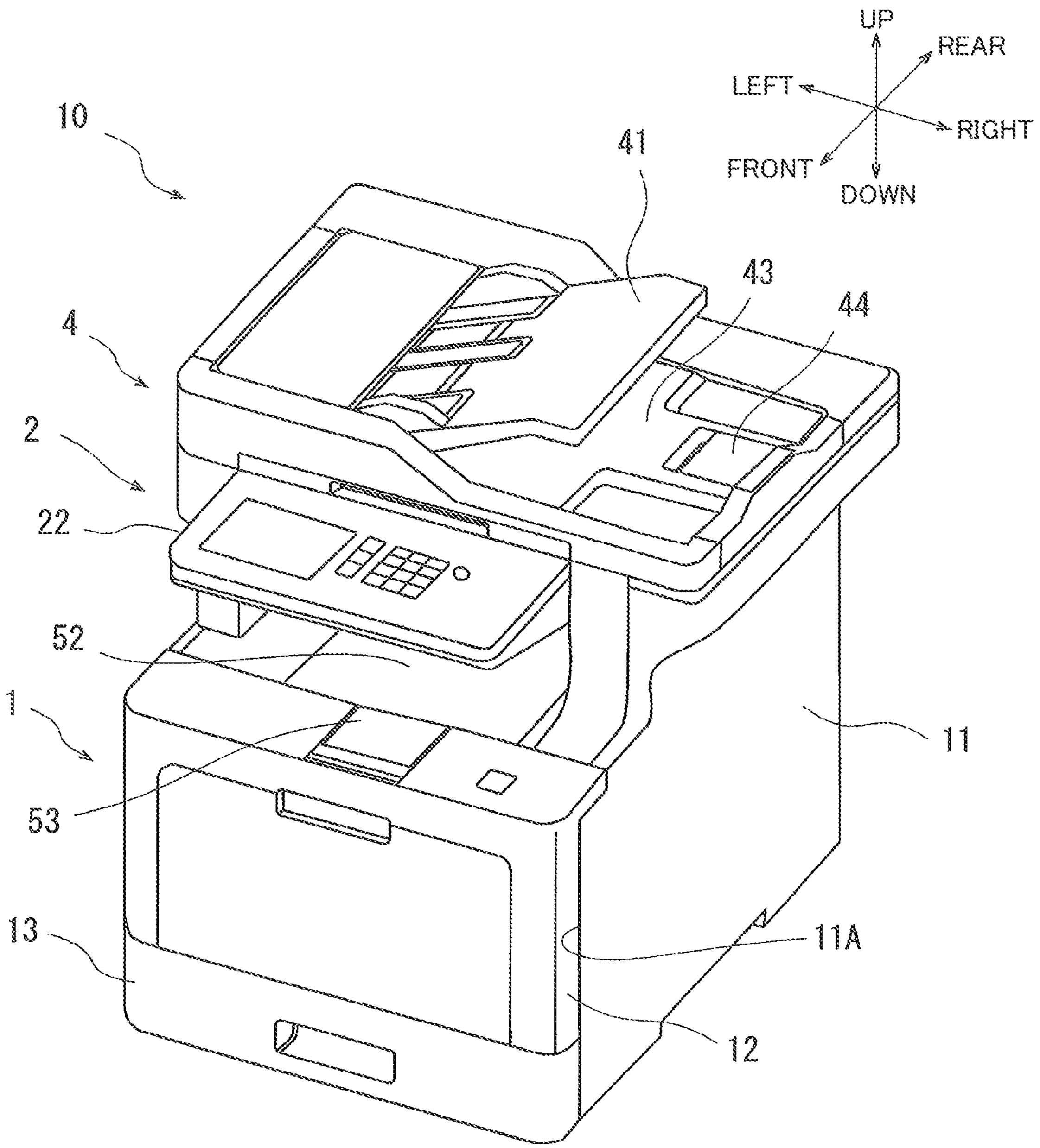
FIG. 1 is a perspective view of an image forming apparatus according to an embodiment.

In the following explanation, a side from which a sheet tray 13 is drawn out is set as a front side, an opposite side thereof is set as a rear side in a state in which the image forming apparatus 10 is installed to be usable is set as a reference state as illustrated in FIG. 1. A right and left direction is defined when the image forming apparatus 10 is seen from the front side, a second housing 2 side of the image forming apparatus 10 is set as an upper side and a first housing 1 side is set as a lower side to define respective directions. In the embodiment, the right and left direction is an example of a width direction orthogonal to a sheet discharging direction of a sheet S by a sheet-discharging roller 51.

<Schematic Configuration of Image Forming Apparatus>

Figure 2:
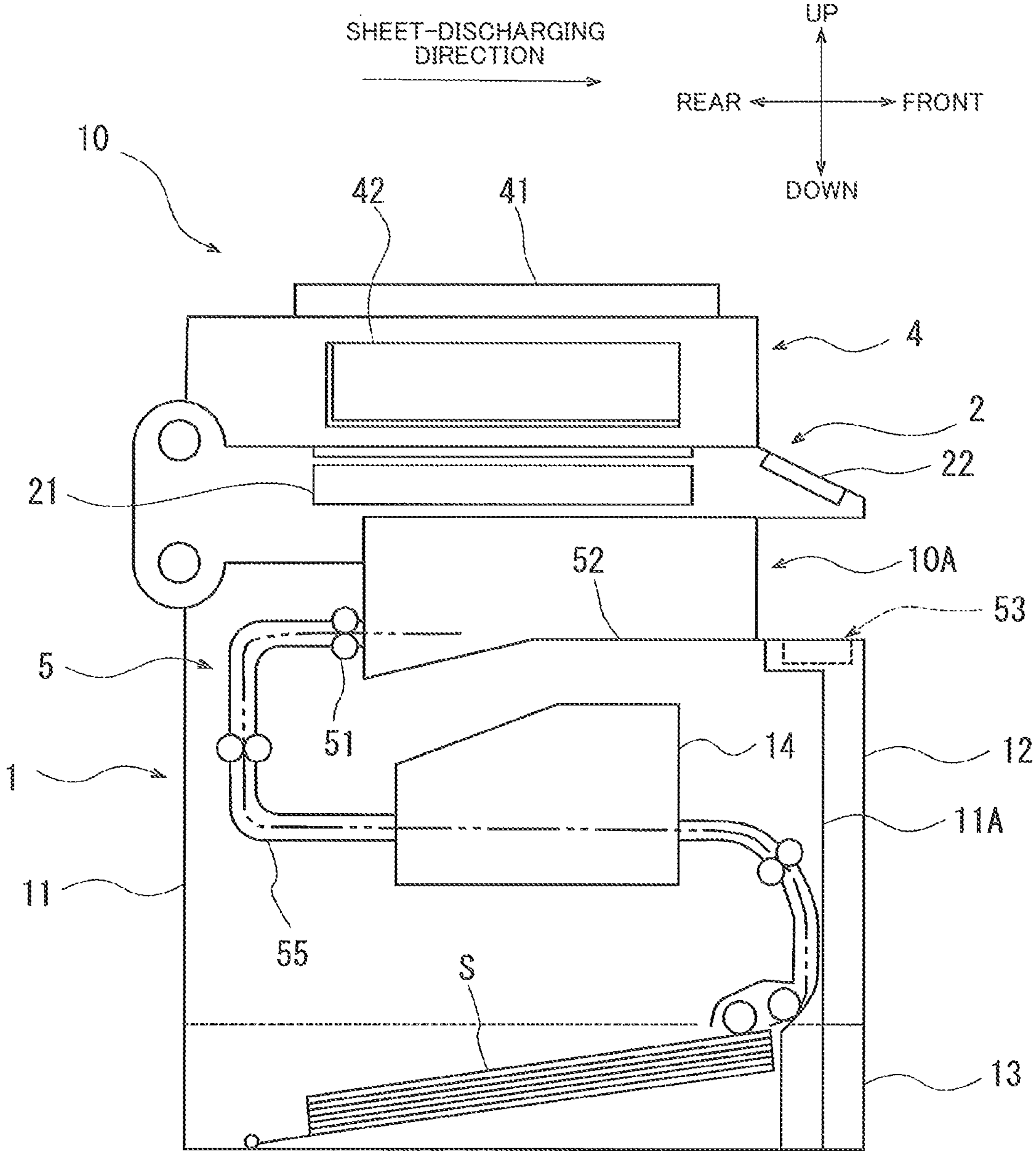
FIG. 2 is a schematic side view illustrating an outline of an internal configuration of the image forming apparatus according to the embodiment.

As illustrated in FIG. 1 and FIG. 2, the image forming apparatus 10 according to the present embodiment includes the first housing 1, the second housing 2, and an ADF (auto document feeder) 4.

The first housing 1 is a housing having an approximately rectangular-parallelepiped shape. The housing 1 includes a housing body 11 having an opening 11A located in front of the housing body 11. The opening 11A is accessible to an inside of the image forming apparatus 10. The housing 1 further includes an opening/closing cover 12 configured to pivot in a front and rear direction so as to open/close the opening 11A. A lower end portion of the opening/closing cover 12 is coupled to the body housing 11 so that an upper part of the opening/closing cover 12 is pivotable in the front and rear direction about a pivotal shaft 12A (see FIG. 5) extending in the right and left direction and provided at a lower part of the opening/closing cover 12.

The first housing 1 includes the sheet tray 13 accommodating the sheet S, the sheet conveying device 5 configured to convey the sheet S from the sheet tray 13 to an outside of the first housing 1, and an image forming unit 14 configured to form an image on the sheet S. The configuration of the image forming unit 14 is not particularly limited, and configurations such as an electrophotographic type, an ink-jet type, a thermal head type, and so on can be used.

The second housing 2 is a housing having an approximately rectangular-parallelepiped shape, and the second housing 2 is located above the first housing 1. The second housing 2 covers an upper surface of the first housing 1. The second housing 2 accommodates an image reading unit 21 configured to read a document. The second housing 2 also includes an operating unit 22 such as a touch panel and operation buttons for operating the image forming apparatus 10 on a front side.

The ADF 4 is a housing having an approximately rectangular-parallelepiped shape, and the ADF 4 is located above the second housing 2. The ADF 4 covers an upper surface of the second housing 2. A front portion of the ADF 4 vertically pivots with respect to the second housing 2. The ADF 4 includes a document supply tray 41, a document conveying mechanism 42 configured to convey the document, a document sheet-discharge tray 43, and a document stopper 44 configured to stop movement of the document discharged on the document sheet-discharge tray 43. The image reading unit 21 includes a document glass having an upper surface on which the document can be placed, and a portion of the ADF 4 located below the document sheet-discharge tray 43 and facing the document glass holds the document.

<Configuration of Sheet Conveying Device>

As illustrated in FIG. 2 to FIG. 5, the sheet conveying device 5 includes the sheet-discharging roller 51, a sheet-discharge tray 52, a sheet-discharge stopper 53 made of resin, and a sheet-discharge stopper urging portion 54.

The image forming apparatus 10 has a form of a so-called in-body sheet discharging type. As illustrated in FIG. 2, the image forming apparatus 10 includes a sheet outlet 10A in the front as an opening located between an upper surface of the first housing 1 and a lower surface of the second housing 2. The first housing 1 includes the sheet-discharge tray 52 on the upper surface thereof. The sheet-discharge tray 52 has a shape inclined upward from the rear to the front. The sheet conveying device 5 has a conveying path 55 connecting from the sheet tray 13 to the sheet-discharge tray 52 via the image forming unit 14. The image forming apparatus 10 has a plurality of pairs of conveying rollers in the conveying path 55, and a pair of conveying rollers located at the most downstream part of the conveying path 55 are a pair of the sheet-discharging rollers 51. The pair of the sheet-discharging rollers 51 will be referred to as the sheet-discharging roller 51. The sheet-discharge tray 52 is located downstream of the sheet-discharging roller 51 in the sheet discharging direction, and the sheet-discharging roller 51 discharges the sheet S onto the sheet-discharge tray 52. In the present disclosure, a direction in which the sheet-discharging roller 51 discharges the sheet S toward the sheet-discharge tray 52 is defined as the sheet discharging direction. The sheet discharging direction is a direction directed from the rear to the front of the image forming apparatus 10 in FIG. 1 and FIG. 2. A direction directed from the front to the rear of the image forming apparatus 10 in FIG. 1 and FIG. 2 is defined as an inverse sheet discharging direction.

Figure 4:
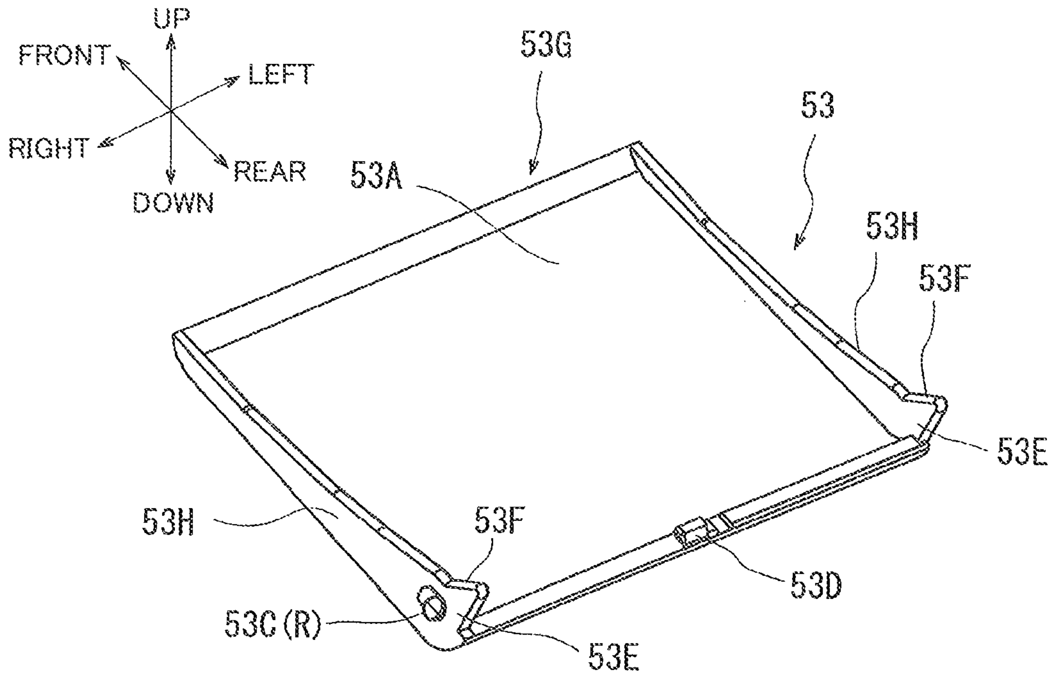
FIG. 4 is a perspective view of the sheet-discharge stopper in a use state relating to the image forming apparatus according to the embodiment.
Figure 5:
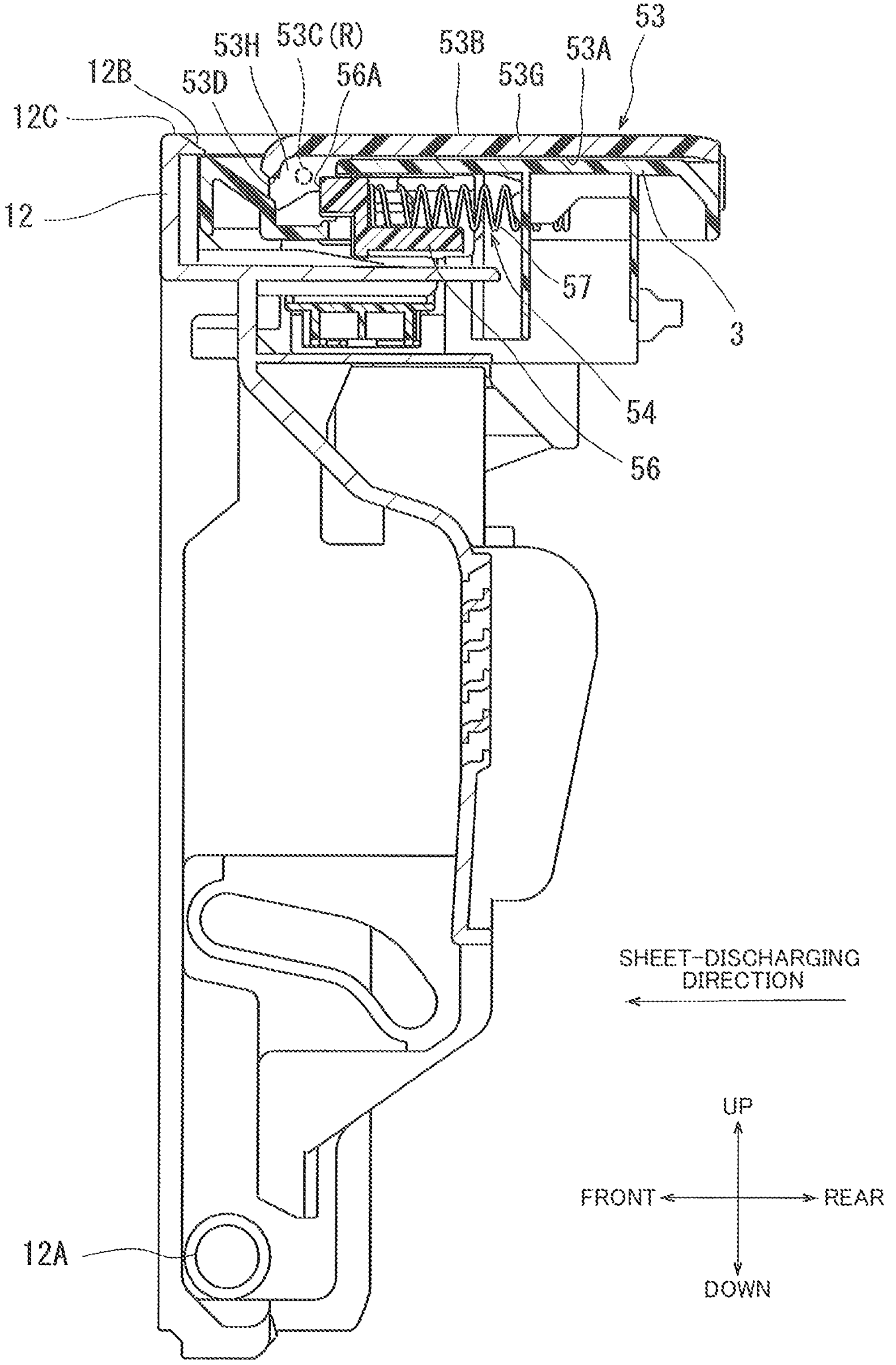
FIG. 5 is a cross-sectional view taken along V-V line in FIG. 3, which is a cross-sectional view of a relevant part when the sheet-discharge stopper is in the non-use state relating to the image forming apparatus according to the embodiment.
Figure 10:
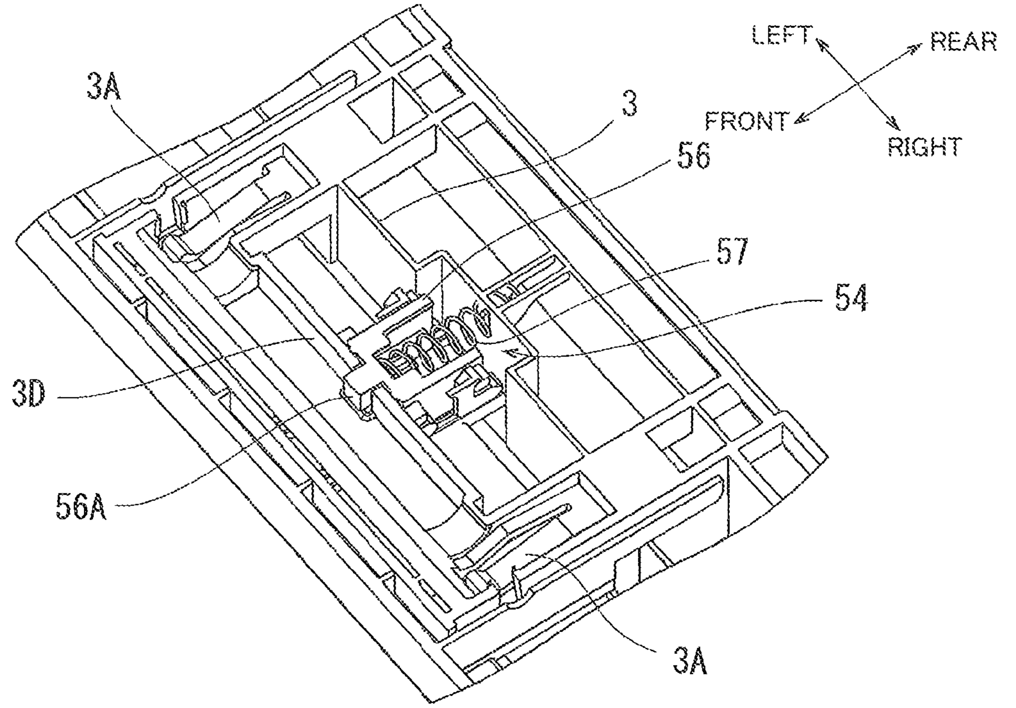
FIG. 10 is a partial perspective view illustrating a stopper urging portion relating to the image forming apparatus according to the embodiment.
Figure 11:
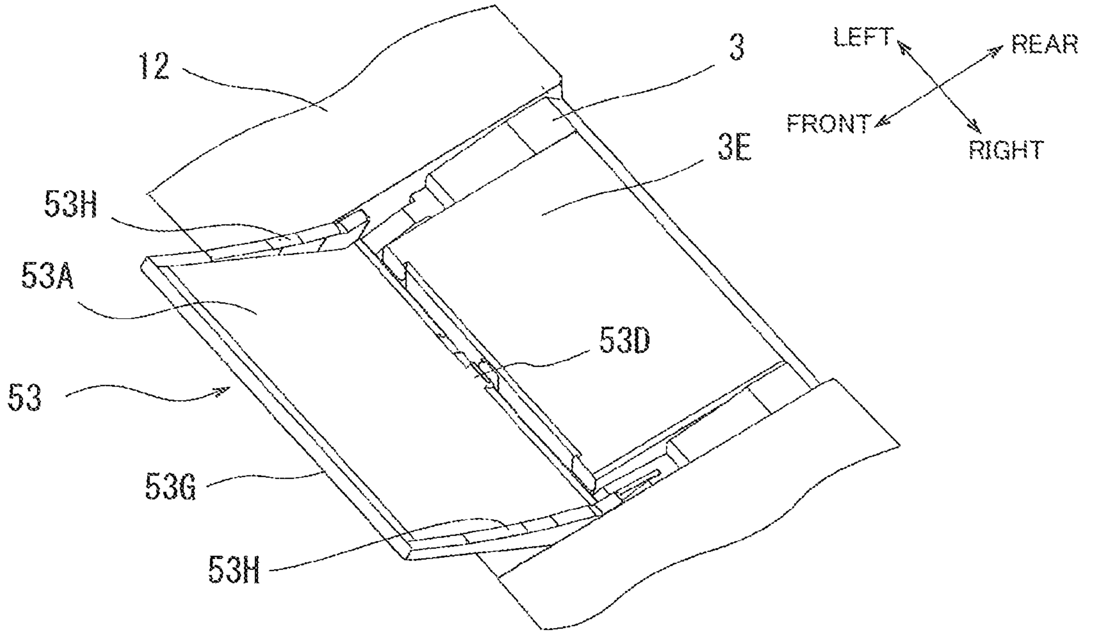
FIG. 11 is a partial perspective view illustrating a state in which the sheet-discharge stopper is located at the first use position in the use state relating to the image forming apparatus according to the embodiment.

As illustrated in FIG. 5 and FIG. 10, the image forming apparatus 10 has a holding member 3 made of resin. The holding member 3 is located at an upper end of the opening/closing cover 12, and configured to hold the sheet-discharge stopper 53 and the stopper urging portion 54. As illustrated in FIG. 11, the holding member 3 has a cover plate 3E, and the cover plate 3E covers an upper part of the stopper urging portion 54. The sheet-discharge stopper 53 is located at a front end part on the upper surface of the first housing 1 and located downstream of the sheet-discharge tray 52 in the sheet discharging direction as illustrated in FIG. 2. The sheet-discharge stopper 53 includes a first surface 53A and a second surface 53B which is a back side of the first surface 53A as illustrated in FIG. 3 and FIG. 4.

Figure 6:
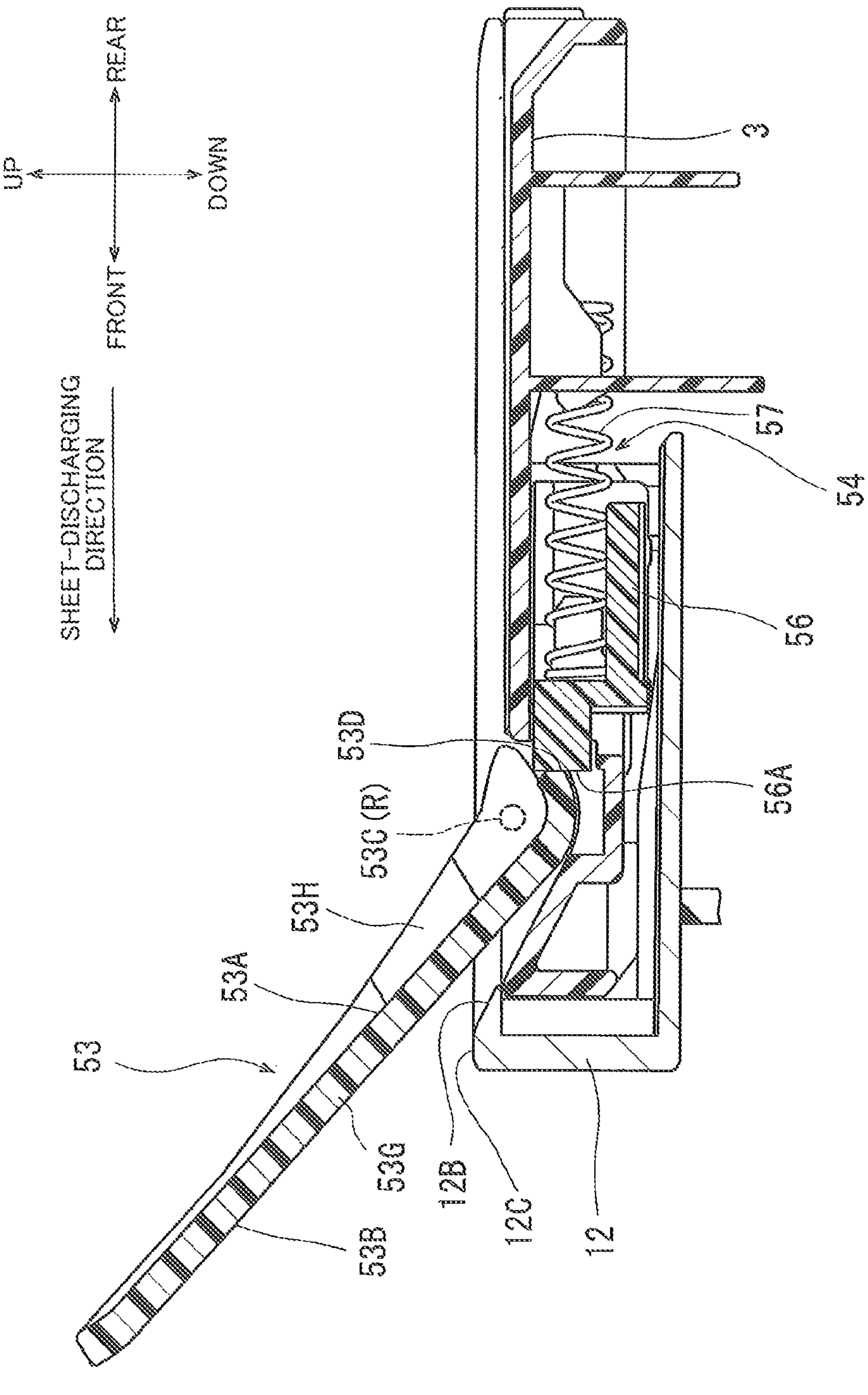
FIG. 6 is a cross-sectional view of a relevant part when the sheet-discharge stopper is located at a first use position in the use state relating to the image forming apparatus according to the embodiment.
Figure 7:
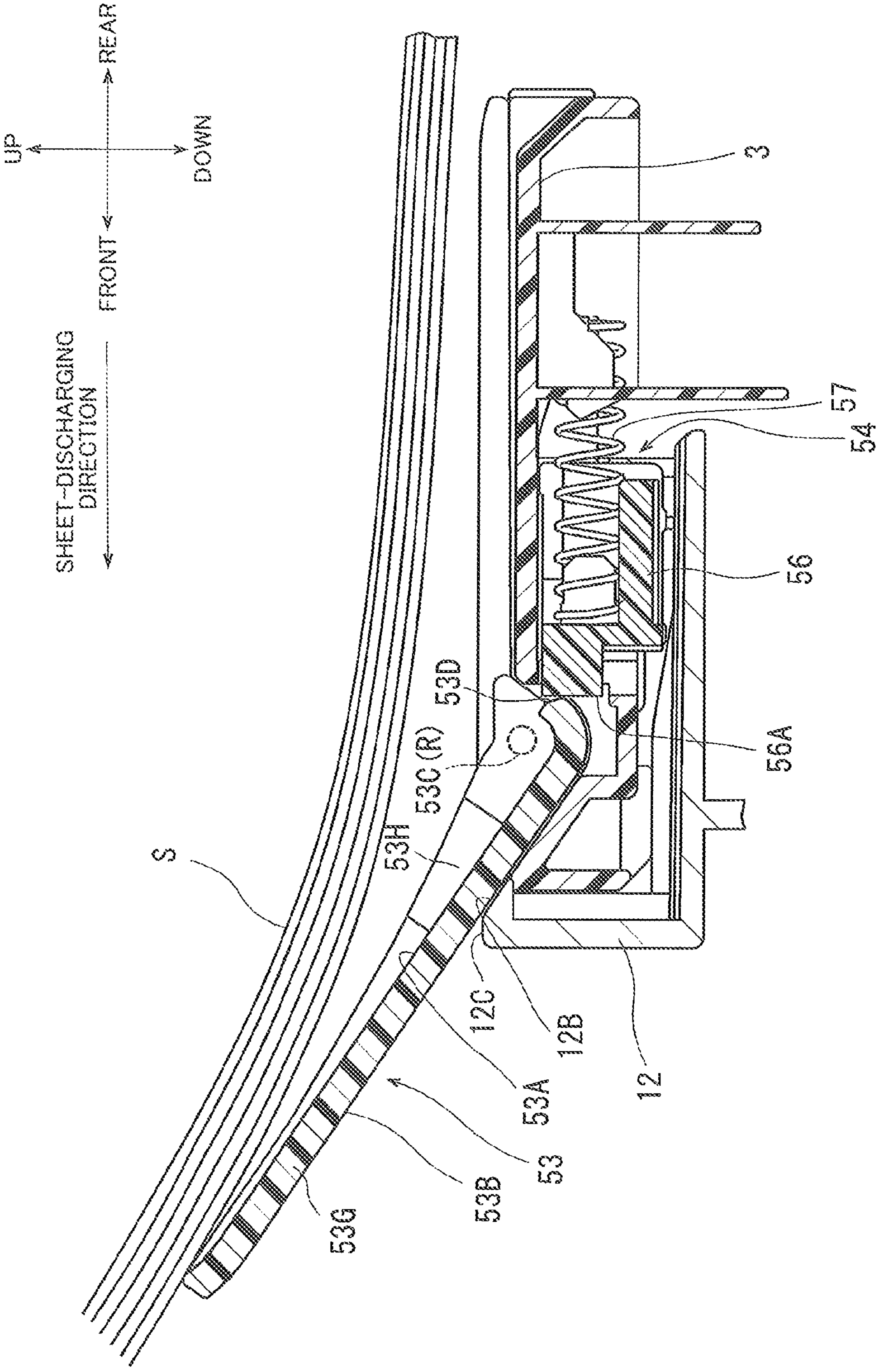
FIG. 7 is a cross-sectional view of a relevant part when the sheet-discharge stopper is located at a second use position in the use state relating to the image forming apparatus according to the embodiment.
Figure 8:
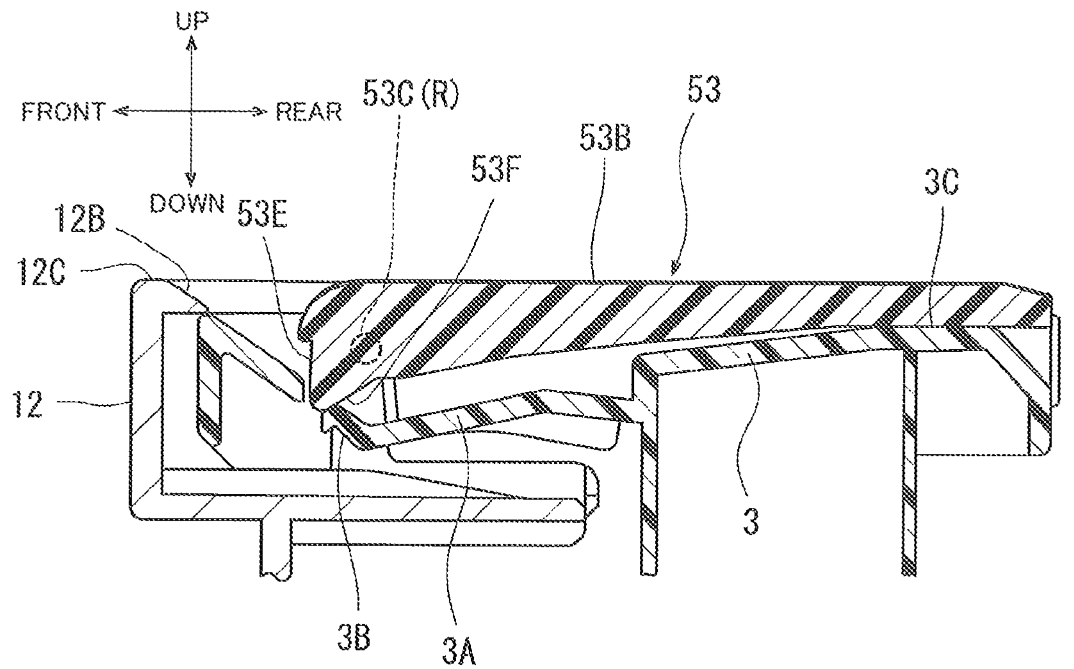
FIG. 8 is a cross-sectional view taken along VIII-VIII line in FIG. 3, which is a cross-sectional view of a relevant part illustrating a state in which the sheet-discharge stopper is in the non-use state and an engaging protrusion of the sheet-discharge stopper is engaged with a pivot-limiting portion relating to the image forming apparatus according to the embodiment.

The sheet-discharge stopper 53 is pivotable between a non-use state in which the second surface 53B faces upward as illustrated in FIG. 5 and a use state in which the first surface 53A faces upward as illustrated in FIG. 6, FIG. 7, and FIG. 11. The sheet-discharge stopper 53 is configured so that an end portion on a distal-end side of the sheet-discharge stopper 53 is in contact with an upper surface 3C of the holding member 3 in the non-use state as illustrated in FIG. 8. The second surface 53B of the sheet-discharge stopper 53 approximately aligns with an upper end surface 12C of the opening/closing cover 12 in the non-use state. The sheet-discharge stopper 53 includes a plate-shaped stopper body 53G having the second surface 53B facing upward in the non-use state and the first surface 53A facing downward in the non-use state. The sheet-discharge stopper 53 includes wall portions 53H having a pair of a right wall and a left wall each extending downward from the stopper body 53G of the sheet-discharge stopper 53 in the non-use state as illustrated in FIG. 5. The wall portions 53H include engaging shaft portions 53C having a pair of a right protrusion and a left protrusion each protruding toward outer sides in the right and left direction (width direction) at a front end of the sheet-discharge stopper 53 in the use state. The engaging shaft portions 53C are located lower than the second surface 53B and located lower than the first surface 53A in the non-use state. The sheet-discharge stopper 53 is configured to pivot with respect to the opening/closing cover 12 by engagement of the engaging shaft portions 53C and not-illustrated engaged portions having a recessed shape provided in the holding member 3. That is, the sheet-discharge stopper 53 is pivotable with respect to the opening/closing cover 12 about a pivotal axis R, which is an engagement portion between the engaging shaft portions 53C and the engaged portions. In the following explanation, a side where the pivotal axis R is provided is defined as a base-end side and the opposite side is defined as a distal-end side in the front and rear direction of the sheet-discharge stopper 53.

Figure 9:
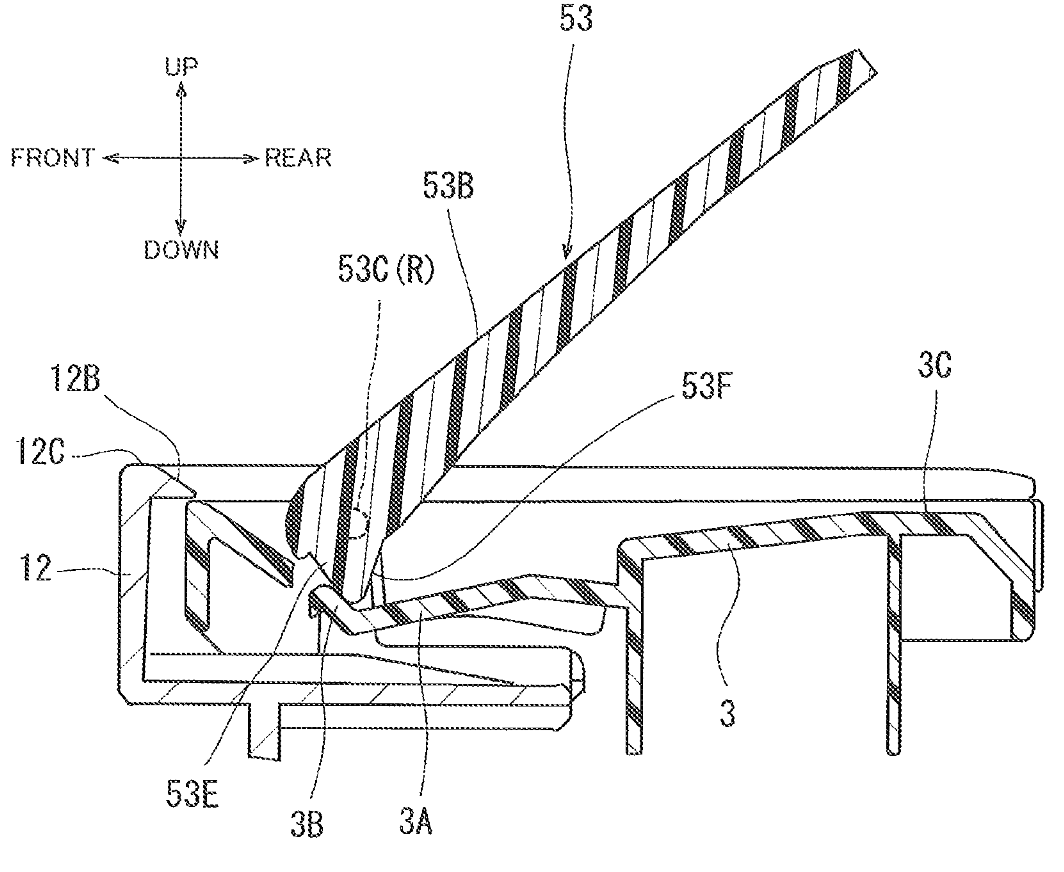
FIG. 9 is a cross-sectional view taken along VIII-VIII line in FIG. 3, which is a cross-sectional view of a relevant part illustrating a state just after the engagement between the engaging protrusion of the sheet-discharge stopper and the pivot-limiting portion is released relating to the image forming apparatus according to the embodiment.

As illustrated in FIG. 8 to FIG. 10, the holding member 3 includes pivot-limiting portions 3A, as an example of a second limiting portion, including a pair of a right spring and a left spring each having a plate spring shape. The pivot-limiting portions 3A are configured to limit pivoting of the sheet-discharge stopper 53 in the non-use state when the opening/closing cover 12 pivots in an open direction. The pivot-limiting portions 3A extend from the rear to the front at right and left both ends of the holding member 3, and tip ends of the pivot-limiting portions 3A are vertically swingable by elastic deformation. The pivot-limiting portions 3A have bending tip portions 3B, tips of which are bent and extend diagonally upward from the rear to the front. On the other hand, as illustrated in FIG. 4, the sheet-discharge stopper 53 includes engaging protrusions 53E having a pair of a right protrusion and a left protrusion at end portions on the base-end side of the sheet-discharge stopper 53. The engaging protrusions 53E have inclined surfaces 53F inclined downward from the rear to the front in the sheet-discharge stopper 53 in the non-use state as illustrated in FIG. 8. When the engaging protrusions 53E are snap-engaged with the pivot-limiting portions 3A in a state in which the inclined surfaces 53F are in contact with the bending tip portions 3B, pivoting of the sheet-discharge stopper 53 in the non-use state is limited.

Figure 3:
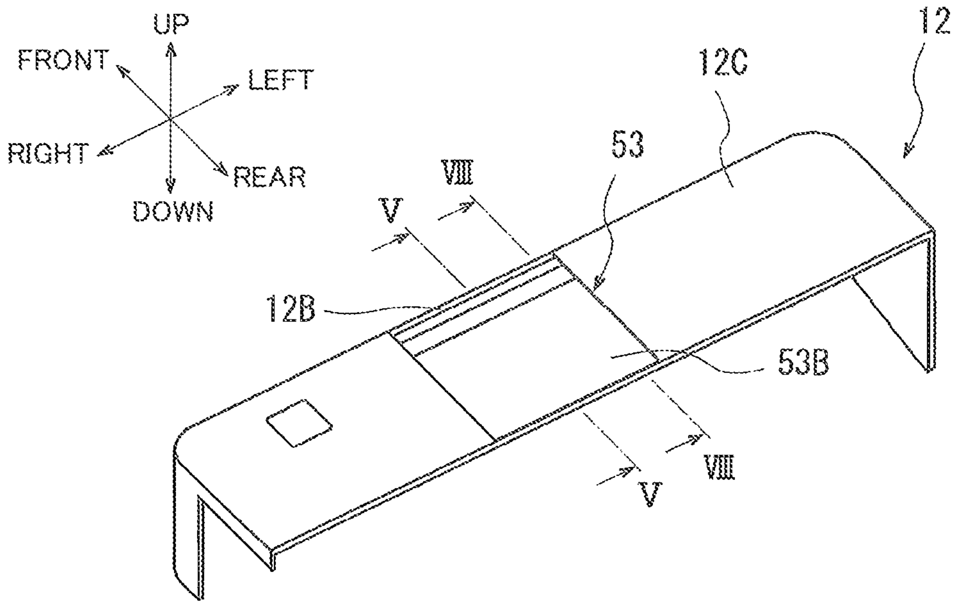
FIG. 3 is a perspective view schematically illustrating an opening/closing cover when a sheet-discharge stopper is in a non-use state relating to the image forming apparatus according to the embodiment.

As illustrated in FIG. 3, the opening/closing cover 12 includes a limiting portion 12B, as an example of a first limiting surface, extending in the right and left direction for a width of the sheet-discharge stopper 53 at a front end part of the upper end surface 12C of the opening/closing cover 12. The limiting portion 12B is formed by an inclined surface inclined downward from the front to the rear. When the second surface 53B of the sheet-discharge stopper 53 in the use state is in contact with the limiting portion 12B by surface contact, the maximum pivotal position of the sheet-discharge stopper 53 is limited.

The stopper urging portion 54 includes a contact member 56 made of resin and an urging member 57 configured to urge the contact member 56 as illustrated in FIG. 5 and FIG. 10. The contact member 56 and the urging member 57 are both provided upstream of the pivotal axis R of the sheet-discharge stopper 53 in the sheet discharging direction. The urging member 57 is a compression coil spring extending horizontally in the sheet discharging direction. A front end of the urging member 57 is fixed to the contact member 56 and a rear end of the urging member 57 is fixed to the holding member 3. When the sheet-discharge stopper 53 is in the non-use state, a front end of the contact member 56 is in contact with a wall 3D of the holding member 3 and the urging member 57 is compressed. The contact member 56 can reciprocate horizontally in the sheet discharging direction while being held by the holding member 3. The contact member 56 has a contact surface 56A orthogonal to the sheet discharging direction at a downstream end of the contact member 56 in the sheet discharging direction. It is noted that the contact member 56 is an example of a spring cover which includes a main body configured to cover the spring and a protrusion protruding from the main body toward the sheet-discharge stopper 53 and having the contact surface 56A being in contact with the sheet-discharge stopper 53 in the use state.

As illustrated in FIG. 6 and FIG. 7, the contact member 56 is in contact with the sheet-discharge stopper 53 in the use state. The sheet-discharge stopper 53 includes a contacted-portion 53D being in contact with the contact member 56 in the use state. The contacted-portion 53D is an example of a stopper protrusion. The contacted-portion 53D is located at the center in the width direction orthogonal to the sheet discharging direction of the sheet-discharge stopper 53, namely, the center of the sheet-discharge stopper 53 in the right and left direction illustrated in FIG. 4. The contact surface 56A of the contact member is located at a position opposed to the contacted-portion 53D. The stopper body 53G has a curved portion in which a front end portion is curved downward in the non-use state as illustrated in FIG. 5, and the stopper body 53G has the contacted-portion 53D on an inner surface of the curved portion. The contacted-portion 53D is located upstream of the pivotal axis R in the sheet discharging direction in the use state of the sheet-discharge stopper 53, and the contacted-portion 53D is located downstream of the pivotal axis R in the sheet discharging direction in the non-use state. The sheet-discharge stopper 53 is pivotable between a first use position at which the contacted-portion 53D is in contact with the contact surface 56A and a second use position at which the distal end of the sheet-discharge stopper 53 is lowered from the distal end at the first use position and moves forward. The first use position is a position at a timing when the contacted-portion 53D of the sheet-discharge stopper 53 which changes from the non-use state to the use state comes into contact with the contact surface 56A. As illustrated in FIG. 6, the contacted-portion 53D of the sheet-discharge stopper 53 located at the first use position comes into surface contact with the contact surface 56A so that the contacted-portion 53D extends along the contact surface 56A. That is, the contacted-portion 53D of the sheet-discharge stopper 53 at the first use position is a surface orthogonal to the sheet discharging direction. As illustrated in FIG. 7, when the second surface 53B of the sheet-discharge stopper 53 at the second use position is in surface contact with the limiting portion 12B, the maximum pivotal position of the sheet-discharge stopper 53 is limited.

The contacted-portion 53D of the sheet-discharge stopper 53 in the non-use state is located lower than the second surface 53B and is located lower than the first surface 53A as illustrated in FIG. 5. The contacted-portion 53D is a surface facing downward in the non-use state of the sheet-discharge stopper 53. That is, the contacted-portion 53D is hidden in the non-use state of the sheet-discharge stopper 53. In other words, the contacted-portion 53D is covered with the second surface 53B of the stopper body 53G and is located at a position not exposed to the outside in the non-use state.

<Effects>

Operations and effects of the sheet conveying device 5 and the image forming apparatus 10 having the above configuration will be explained as follows. When the sheet-discharge stopper 53 in the non-use state illustrated in FIG. 5 is put in to the use state, the user lifts a rear end portion of the sheet-discharge stopper 53 in the non-use state. When the rear end portion of the sheet-discharge stopper 53 in the non-use state is lifted upward as illustrated in FIG. 9, the pivot-limiting portions 3A are elastically deformed so that the bending tip portions 3B pressed by the inclined surfaces 53F move downward, and snap engagement between the engaging protrusions 53E and the pivot-limiting portions 3A is released. Accordingly, the sheet-discharge stopper 53 becomes pivotable about the pivotal axis R. Then, when the sheet-discharge stopper 53 pivots until the contacted-portion 53D comes into contact with the contact surface 56A, the sheet-discharge stopper 53 is located at the first use position illustrated in FIG. 6, where the distal end of the sheet-discharge stopper 53 is directed to the sheet discharging direction and the first surface 53A faces upward.

As described above, the sheet-discharge stopper 53 becomes in the use state in which the sheet S discharged on the sheet-discharge tray 52 can be supported. In the use state of the sheet-discharge stopper 53, even when the sheet S with a length protruding from the sheet-discharge tray 52 is discharged on the sheet-discharge tray 52, a downstream end of the sheet S in the sheet discharging direction comes into contact with the first surface 53A of the sheet-discharge stopper 53. Accordingly, even when the sheet S with the length protruding from the sheet-discharge tray 52 is discharged on the sheet-discharge tray 52, it is possible to prevent such sheet S from falling out of the apparatus.

When the sheet-discharge stopper 53 located at the first use position in the use state supports the sheet S, the distal end of the sheet-discharge stopper 53 is to move downward by weight of the sheet S. Since the contacted-portion 53D is in contact with the contact surface 56A at this time, the sheet-discharge stopper 53 is to move the contact member 56 in the inverse sheet discharging direction. When a load generated by the sheet-discharge stopper 53 supporting the sheets S exceeds a restoring force of the urging member 57, the distal end of the sheet-discharge stopper 53 is lowered and the sheet-discharge stopper 53 moves the contact member 56 in the inverse sheet discharging direction. Accordingly, the urging member 57 is deflected, and an urging force is accumulated in the urging member 57. The urging member 57 in which the urging force is accumulated urges the contact member 56 in a direction in which the sheet-discharge stopper 53, the position of the distal end of which is lowered from the distal end at the first use position, is moved to the first use position. When the distal end of the sheet-discharge stopper 53 supporting a large number of sheets S is largely lowered, the second surface 53B comes into contact with the limiting portion 12B. Accordingly, the sheet-discharge stopper 53 is located at the second use position illustrated in FIG. 7, where the maximum pivotal position of the sheet-discharge stopper 53 is limited.

As described above, the distal end of the sheet-discharge stopper 53 in the use state is lowered in accordance with the weight of the supported sheet S, and the pivoting in which the distal end repeatedly moves upward and downward in accordance with variation in weight. At this time, the contact member 56 is continually in contact with the contacted-portion 53D of the sheet-discharge stopper 53 with the urging force from the urging member 57. Accordingly, there is a possibility that scratches occur on the contacted-portion 53D of the sheet-discharge stopper 53. In this point, since the contacted-portion 53D is hidden in the non-use state of the sheet-discharge stopper 53 in the sheet conveying device 5 and the image forming apparatus 10, the contacted-portion 53D on which scratches may occur is not conspicuous to the user.

Therefore, it is possible to provide the sheet conveying device 5 in which scratches are not conspicuous to the user in the non-use state of the sheet-discharge stopper 53. It is also possible to provide the image forming apparatus 10 including the above sheet conveying device.

In the image forming apparatus 10, the contacted-portion 53D is located lower than the second surface 53B and located lower than the first surface 53A, and the contacted-portion 53D is the surface facing downward in the non-use state of the sheet-discharge stopper 53. Therefore, the contacted-portion 53D is not conspicuous to the user standing near the image forming apparatus 10.

The urging member 57 in the image forming apparatus 10 is the compression coil spring provided upstream of the pivotal axis R of the sheet-discharge stopper 53 in the sheet discharging direction and extending horizontally in the sheet discharging direction. And, the contact member 56 is provided upstream of the pivotal axis R in the sheet discharging direction, and the contact member 56 horizontally reciprocates in the sheet discharging direction. In this case, it is possible to easily configure the urging member 57 and the contact member 56 not conspicuous to the user.

The contacted-portion 53D in the image forming apparatus 10 is located upstream of the pivotal axis R in the sheet discharging direction in the use state of the sheet-discharge stopper 53. In this case, it is possible to easily configure the contacted-portion 53D not conspicuous to the user.

The contact member 56 in the image forming apparatus 10 has the contact surface 56A orthogonal to the sheet discharging direction at the downstream end in the sheet discharging direction, and the contacted-portion 53D of the sheet-discharge stopper 53 at the first use position extends along the contact surface 56A. In this case, since the contact surface 56A orthogonal to the sheet discharging direction which is the same as the urging direction of the urging member comes into surface contact with the contacted-portion 53D, it is possible to transmit the urging force of the urging member 57 to the sheet-discharge stopper 53 effectively.

The contacted-portion 53D in the image forming apparatus 10 is located at the center in the width direction orthogonal to the sheet discharging direction of the sheet-discharge stopper 53. In this case, it is possible to hold the state of the sheet-discharge stopper 53 with a good balance by opposing the force from the sheet S.

The opening/closing cover 12 has the limiting portion 12B configured to limit the maximum pivotal position of the sheet-discharge stopper 53 in the image forming apparatus 10. In this case, since the limiting portion 12B limits the maximum pivotal position of the sheet-discharge stopper 53, it is not necessary to receive the sheet-discharge stopper 53 by the urging force of the urging member 57 at the second use position. It is possible to contribute to prevention of deterioration of the urging member 57.

The opening/closing cover 12 includes the holding member 3, and the holding member 3 includes the sheet-discharge stopper 53 and the stopper urging portion 54 in the image forming apparatus 10. In this case, it is possible to provide the image forming apparatus 10 having the sheet conveying device 5 in which scratches on the sheet-discharge stopper 53 are not conspicuous to the user in the non-use state of the sheet-discharge stopper 53.

In the image forming apparatus 10, the opening/closing cover 12 includes the holding member 3, and the holding member 3 includes the pivot-limiting portions 3A configured to limit pivoting of the sheet-discharge stopper 53 in the non-use state when the opening/closing cover 12 pivots in the open direction. In this case, when the opening/closing cover 12 pivots in the open direction, it is possible to limit the pivoting of the sheet-discharge stopper 53 in the non-use state by the pivot-limiting portion 3A.

The embodiment in which the sheet conveying device according to the present disclosure is applied to the sheet conveying device 5 provided at the most downstream part of the conveying path 55 through which the sheet S is conveyed from the image forming unit 14 has been explained in the above embodiment, however, the sheet conveying device according to the present disclosure may be applied to the document conveying mechanism 42, the document sheet-discharge tray 43, and the document stopper 44 in the ADF 4 of the image forming apparatus 10.

The urging member 57 is the compression coil spring in the above embodiment, however, the urging member 57 is not limited to this. That is, the urging member 57 may be an extension coil spring, a plate spring, or the like as long as the urging member can urge the contact member 56 in a direction in which the sheet-discharge stopper 53 moves from the second use position to the first use position.

The embodiment in which the first housing 1 which is a component of the image forming apparatus 10 includes the sheet conveying device according to the present disclosure has been explained in the above embodiment, however, the first housing 1 including the sheet-discharging roller 51, the sheet-discharge tray 52, and the like can be regarded as a housing which is a component of the sheet conveying device according to the present disclosure.

The embodiment in which the contacted-portion 53D faces downward in the non-use state of the sheet-discharge stopper 53 has been explained in the above embodiment, however, the contacted-portion 53D is not limited to this. For example, even when the contacted-portion 53D is a surface facing upward in the non-use state of the sheet-discharge stopper 53, a member configured to cover the contacted-portion 53D may be disposed so that the contacted-portion 53D is not exposed to the outside.

The present disclosure has been explained according to the embodiment as the above; the present disclosure is not limited to the above embodiment and may of course be applied by being suitably modified in a scope not departing from the gist thereof.

The present disclosure can be used for an image forming apparatus, an image reading apparatus, a multifunction device, and so on.

What is claimed is:

1. A sheet conveying device, comprising:

a sheet-discharging roller configured to discharge a sheet in a sheet discharging direction;

a sheet-discharge tray supporting the sheet discharged by the sheet-discharging roller;

a sheet-discharge stopper configured to be brought into contact with a downstream end, in the sheet-discharging direction, of the sheet discharged on the sheet-discharge tray, the sheet-discharge stopper having a first surface and a second surface located on a back side of the first surface and being pivotable between a non-use state in which the second surface faces upward and a use state in which the first surface faces upward, the sheet-discharge stopper being located downstream of the sheet-discharging roller in the sheet discharging direction and pivotable, in the use state, between a first use position and a second use position at which a distal end of the sheet-discharge stopper is lowered from the distal end at the first use position; and a stopper urging portion including a contact member being in contact with the sheet-discharge stopper in the use state and an urging member configured to urge the contact member in a direction in which the sheet-discharge stopper moves from the second use position to the first use position, wherein the sheet-discharge stopper is in contact with the contact member in the use state, and an area, of the sheet-discharge stopper, which is in contact with the contact member in the use state is located below the second surface in the non-use state, wherein the sheet conveying device further comprises a first limiting surface configured to contact the sheet-discharge stopper which is at the second use position so as to limit the sheet-discharge stopper at the maximum pivotal position of the sheet-discharge stopper, the first limiting surface having an inclined flat surface with which a flat surface as the second surface of the sheet-discharge stopper is in surface contact when the sheet-discharge stopper is located at the maximum pivotal position, wherein the urging member is a compression coil spring provided upstream of a pivotal axis of the sheet-discharge stopper in the sheet discharging direction, the compression coil spring extending horizontally in the sheet discharging direction, wherein the contact member is provided upstream of the pivotal axis of the sheet-discharge stopper in the sheet discharging direction, the contact member being configured to reciprocate horizontally in the sheet discharging direction, wherein the area of the sheet-discharge stopper is located upstream of the pivotal axis in the sheet discharging direction in the use state, and wherein the contact member includes a spring cover having a contact surface orthogonal to the sheet discharging direction, and the spring cover has a main body covering the coil spring and a protrusion protruding from the main body toward the sheet-discharge stopper, the contact surface being located at a downstream end of the protrusion in the sheet discharging direction.

2. The sheet conveying device according to claim 1, wherein the area of the sheet-discharge stopper is located at a center of the sheet-discharge stopper in a width direction orthogonal to the sheet discharging direction.

3. The sheet conveying device according to claim 1, wherein the sheet-discharge stopper includes a stopper protrusion protruding from the first surface as the area of the sheet-discharge stopper, and the stopper protrusion is in contact with the contact member in the use state.

4. A sheet conveying device, comprising:

a sheet-discharging roller configured to discharge a sheet in a sheet discharging direction;

a sheet-discharge tray supporting the sheet discharged by the sheet-discharging roller;

a sheet-discharge stopper configured to be brought into contact with a downstream end, in the sheet-discharging direction, of the sheet discharged on the sheet-discharge tray, the sheet-discharge stopper having a first surface and a second surface located on a back side of the first surface and being pivotable between a non-use state in which the second surface faces upward and a use state in which the first surface faces upward, the sheet-discharge stopper being located downstream of the sheet-discharging roller in the sheet discharging direction and pivotable, in the use state, between a first use position and a second use position at which a distal end of the sheet-discharge stopper is lowered from the distal end at the first use position; and a spring; and a spring cover including a main body and a protrusion, the main body being configured to cover the spring, the protrusion protruding from the main body toward the sheet-discharge stopper and having a contact surface orthogonal to the sheet discharge direction, the contact surface of the protrusion being located at a downstream end of the protrusion in the sheet discharge direction, the contact surface of the protrusion being in contact with the sheet-discharge stopper in the use state, the spring being configured to urge the spring cover in a direction in which the sheet-discharge stopper moves from the second use position to the first use position, wherein the sheet-discharge stopper is in contact with the protrusion in the use state, and an area, of the sheet-discharge stopper, which is in contact with the contact surface of the protrusion in the use state is located below the second surface in the non-use state.

5. The sheet conveying device according to claim 4, wherein the protrusion is provided upstream of the pivotal axis of the sheet-discharge stopper in the sheet discharging direction, the protrusion being configured to reciprocate horizontally in the sheet discharging direction.

6. The sheet conveying device according to claim 5, wherein the area of the sheet-discharge stopper is located upstream of the pivotal axis in the sheet discharging direction in the use state.

7. The sheet conveying device according to claim 4, wherein the area of the sheet-discharge stopper is located at a center of the sheet-discharge stopper in a width direction orthogonal to the sheet discharging direction.

8. The sheet conveying device according to claim 4, further comprising a first limiting surface configured to contact the sheet-discharge stopper which is at the second use position so as to limit the sheet-discharge stopper at the maximum pivotal position of the sheet-discharge stopper.

9. The sheet conveying device according to claim 4, wherein the sheet-discharge stopper includes a stopper protrusion protruding from the first surface as the area of the sheet-discharge stopper, and the stopper protrusion is in contact with the contact surface of the protrusion of the spring cover in the use state.

* * * * *